Oct. 27, 1953     T. G. THURSTONE ET AL     2,656,619
OBJECTIVE TEST DEVICE WITH UNIVERSAL SCORING MASK
Filed Nov. 7, 1950     2 Sheets-Sheet 1
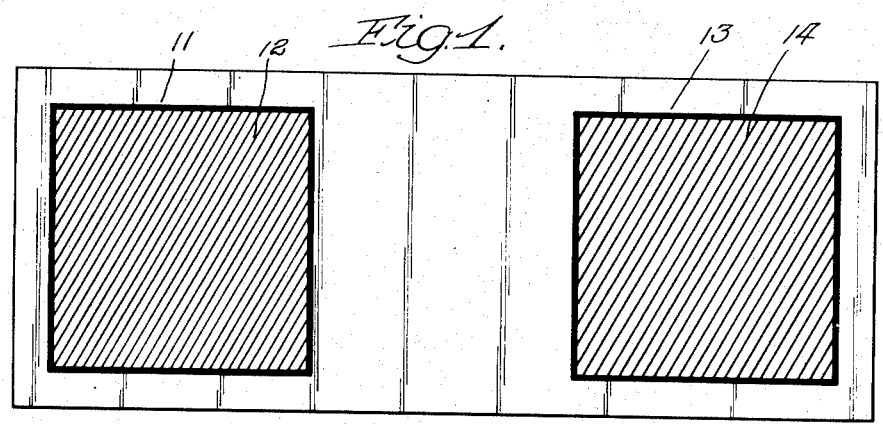
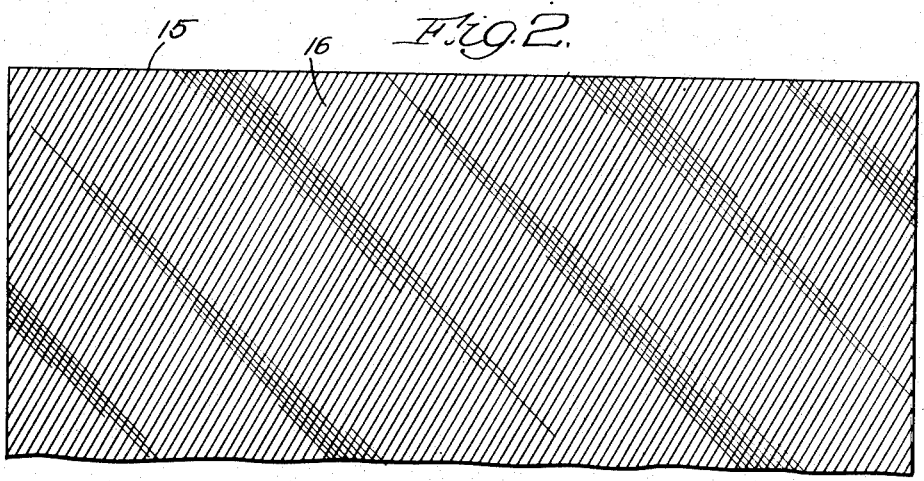
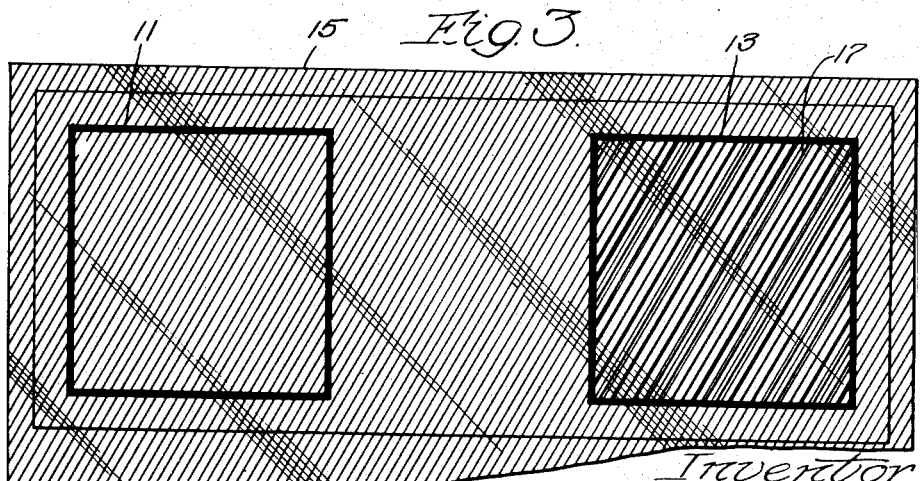
Inventor:
Thelma Gwinn Thurstone,
Louis L. Thurstone,
By Schroeder, Merriam, Hofgren, & Brady, Attys.

Oct. 27, 1953     T. G. THURSTONE ET AL     2,656,619
OBJECTIVE TEST DEVICE WITH UNIVERSAL SCORING MASK
Filed Nov. 7, 1950     2 Sheets-Sheet 2

*Fig. 4*

Inventor:
Thelma Gwinn Thurstone,
Louis L. Thurstone,
By Schroeder, Merriam, Hofgren & Brady, Attys.

Patented Oct. 27, 1953

2,656,619

UNITED STATES PATENT OFFICE 2,656,619

OBJECTIVE TEST DEVICE WITH UNIVERSAL SCORING MASK

Thelma Gwinn Thurstone and Louis L. Thurstone, Chicago, Ill.

Application November 7, 1950, Serial No. 194,522

14 Claims. (Cl. 35—48)

This invention relates to an objective test device, and in particular it relates to a test device which may be scored by an inexperienced person using a single mask for any desired number of completed test papers.

Objective tests are commonly employed in schools, not only to show student progress, but also for making studies of intelligence, vocational aptitude, and other factors. The usual objective test has several separate parts, each designed to cover a phase of the subject upon which the test is being given; and customarily, each part is arranged on a single sheet, the sheets being bound together into a booklet. Objective tests are widely used because the answers may be indicated by placing a check or other mark in any one of several answer spaces; and grading of the test is thus very simply done by clerks having no knowledge of the subject of the test by placing a stencil, or mask, over a completed sheet of the test, the stencil having holes in register with the correct answer spaces.

A source of major error in the correction of these tests is the likelihood that a clerk will incorrectly match a stencil and test sheet, employing for example, a stencil for page 2 with the answers to page 1. This is especially likely to happen in a test having numerous pages, or where a clerk is attempting to grade a large number of tests rapidly. This invention eliminates this source of error by providing test sheets, any number of which may be scored with a single mask.

In the device of the invention, each answer space on a test sheet is shaded, either by placing closely spaced parallel lines across it, or by covering it with small dots as in half-tone printing. The correct answer spaces are given a slightly different shading from the incorrect answer spaces. Thus, for example, with a pattern of lines across the answer spaces there might be fifty lines per inch in the correct answer spaces and forty-seven lines per inch in the incorrect answer spaces. By properly correlating the width of the lines and spaces between the lines, it is possible, with such fine lines, to make both answer spaces appear the same when viewed with the naked eye. The gray tones are equal, and the difference in the number of lines is so small that the resolving power of the human eye is insufficient to observe the difference.

The scoring mask may be a piece of photographic film negative having lines across it similar to those on the answer spaces, but with the number of lines to the inch identical with that on one of the two types of answer spaces. When the scoring mask is superposed over a test sheet, a light interference phenomenon takes place so that the answer spaces in which the number of lines differs from the number of lines in the screen will appear to be crossed by spaced dark stripes. The other answer spaces will not have this appearance under the scoring mask; and accordingly a test scorer may readily observe which marks on the test paper are in the correct answer spaces and which are in the incorrect answer spaces. The mask need not be identical with either of the answer spaces and satisfactory results may be obtained if the mask is markedly more similar to one space than to the other.

This is the simplest form of the device; but it is plain that there are many possible variations. Thus, using half-tone printing the correct answer spaces might have seventy dots to the inch and the incorrect answer space sixty-eight dots to the inch. Again, by correlating size of the dots and the spacing between them the answer spaces will all have the same appearance except when viewed through a photographic film negative screen which has a pattern of dots similar to one of those on the test sheet. In such a case, there would be a pattern of dark spots on one type of answer space and not on the other. The phenomenon is the same as that which produces "beats" in sound.

Other variations may be obtained with the parallel line arrangement on the answer spaces by using a scoring screen in which the lines are at an angle different from that of the lines on the answer spaces. In such a case, a series of transverse lines will appear upon certain answer spaces when the mask is superposed upon the test sheet.

Multiple choice tests sheets may be prepared with a random disposition of visually different answer areas, provided the differences and arrangement are such that they provide no clue to the correct answer area. Thus, for example, five answer spaces may be printed in half-tone so as to give a 50% grey value, with the following arrangement: (1) 70 dots to the inch, (2) 90 dots to the inch, (3) 130 dots to the inch, (4) 150 dots to the inch, all with vertical orientation, (5) 130 dots to the inch with a 45° diagonal orientation. Using a 60 dot half-tone scoring mask, the foregoing answer areas appear as follows: (1) ten dark spots per linear inch (70—60), (2) thirty dark spots per linear inch (90—60), (3) ten dark spots per linear inch (130—[2×60]),
(4) thirty dark spots per linear inch (150—[2×60])

(5) no dark spots, because the 45° orientation cancels out the difference between the answer area and the scoring mask. Examples (2) and (4) will present an unspotted appearance, because the 30 dark spots to the inch are so close together that the surface looks clear.

Working on the above principles, it is possible to produce so many variations in the appearance of the answer areas that they furnish no clue to the identity of the one correct answer area for each question. Thus one correct answer area might have a 45° orientation diagonal to the right, a second a 150 dot arrangement, a third a 90 dot arrangement, a fourth a 60 dot arrangement, a fifth a 120 dot arrangement, and a sixth a 45° orientation to the left. All will appear clear under the mask, indicating a correct answer area. In correct answer areas might have, for example, the following arrangements: (1) 65, or 125, or 185 dots to the inch—producing five well defined dark areas per inch; (2) 70, or 130, or 190 dots to the inch—producing ten well defined dark areas per inch; (3) 75, or 135, or 195 dots to the inch—producing fifteen well defined dark areas per inch. Each of these nine different incorrect answer areas will be readily distinguishable under the scoring mask from any of the correct answer areas.

Normally the test sheet will be so arranged that the incorrect answer spaces will present a striped, or patterned appearance when viewed through the scoring mask, while the correct answer spaces appear clear—free of dark markings.

The advantages of the above construction are believed to be obvious. There is no difference in appearance between correct and incorrect answer spaces insofar as the person taking the test is concerned; but the person scoring the test can immediately differentiate the correct from the incorrect spaces when the mask is placed upon the test sheet. The mask need not be in precise register with the test sheet because it carries the given pattern of shading over its entire surface. Likewise a single mask can be used for scoring all the sheets of a single test and even for scoring many different tests.

By varying the pattern of shading from test to test, and using a number of different types of masks, all made according to the same principle, it is possible to eliminate any chance of a student learning the test scoring method and providing himself with a small masking piece which would permit him to cheat on the test.

The invention is illustrated in a preferred embodiment in the accompanying drawings, in which:

Fig. 1 is a greatly enlarged schematic view showing two answer squares on a test sheet embodying the invention;

Fig. 2 is a fragmentary plan view of a scoring mask;

Fig. 3 is a view of the enlarged answer squares of Fig. 1 as viewed through the mask of Fig. 2; and Fig. 4 is a plan view of a test sheet to show the approximate size of answer spaces and arrangement of the sheet.

Referring to the drawings in greater detail, and referring especially to Fig. 4, a test sheet indicated generally at 10, is provided with successive questions which, in an actual test sheet, would appear opposite the numbers in the left hand margin of the sheet. Adjacent each question is a pair of answer spaces 11 and 12, one of said spaces being a correct answer space and the other being an incorrect answer space. The invention is illustrated as applied to a True-False type of test, although it is plain that it is equally applicable to the multiple choice, or best answer type of test.

Referring now to Figs. 1–3, the correct answer space 11 is shown as having forty lines 12 extending diagonally across its surface, while the incorrect answer space 13 has thirty-three lines 14. This large difference in the number of lines in the two spaces would not normally be employed in a simple True-False test sheet because the difference in their appearance is quite plain to the eye. However, for clarity of illustration herein the answer spaces are made visibly different. In an actual test sheet, the difference in the number of lines would be so correlated with the width of lines and the spacing between lines that the two spaces would appear the same. The lines in the answer spaces 11 and 13 form a pattern of shading, so that each answer space comprises a shaded area on the test sheet. As previously stated, a multiple choice test may well have a random disposition of visually different answer spaces such that there is no clue as to the correct answer space except with the scoring mask in place.

A scoring mask 15 consists of a piece of photographic film negative on which appears a pattern of lines 16, the number of lines 16 to the inch preferably being the same as the number of lines 12 to the inch. A photographic film negative is sufficiently transparent that a mark made in an answer space is clearly visible through the negative, unless the dark portions of the negative are extremely heavily developed. A normally developed negative is perfectly satisfactory for use in test scoring. In order to give the film negative mask sufficient permanence and rigidity for easy use, it will ordinarily be mounted upon a glass or transparent plastic back, or it may if desired be provided with a rigid frame.

Fig. 3 illustrates the effect of superposing the mask 15 upon the test sheet 10. Since the mask has the same number of lines per inch as does the answer space 11, the answer space looks substantially the same when viewed through the scoring mask 15 as it does when viewed without it. The pattern is generally the same, but somewhat darker. On the other hand, the answer space 13, which has a different number of lines to the inch from the number on the mask, has a characteristic pattern 17 of dark and light areas, when viewed through the mask. This pattern is due to light interference phenomena which are caused by certain of the lines in the answer space 13 being reinforced by the lines in the scoring mask 15, while other lines in the answer space are not so reinforced. Accordingly, there are some places where the lines of the answer space 13 appear of double width, or appear to be very close together; while in other areas, the lines appear to be far apart because the dark portions of the negative overlie the lines in the answer space, substantially blanking them out.

The foregoing detailed description is given for clearness of understanding only, and no unnecessary limitations should be understood therefrom, for some modifications will be obvious to those skilled in the art.

I claim:

1. An objective test unit, comprising: a test sheet having shaded areas over at least its answer portions, the shaded areas having patterns which differ as between correct and incorrect answer areas in a manner which is not apparent upon visual inspection, and a transparent scoring mask having substantially one pattern which creates light interference phenomena when superimposed upon the patterns of the answer areas to vary the appearance as between correct and incorrect answer areas, thereby visually differentiating them.

2. An objective test unit comprising, a test sheet having shaded areas over at least its answer portions, the shaded areas having patterns visually apparently alike, but actually slightly different as between correct and incorrect answer areas, and a transparent scoring mask having substantially one pattern, the two patterns creating light interference phenomena when superimposed.

3. A test unit according to claim 2 wherein the pattern of the scoring mask is substantially of the same character as those on the test sheet and is markedly more like one of said patterns than like the others.

4. A test unit according to claim 2 wherein the scoring mask is photographic film and the darkest parts thereof do not conceal a pencil mark on the test sheet.

5. A test unit according to claim 2 wherein the patterns in the shaded areas comprise fine dark marks evenly distributed on a light background, the size and spacing of marks differing slightly between correct and incorrect answer areas but the gray tone thereof being visually apparently the same.

6. A test unit according to claim 5 wherein the marks are fine parallel lines.

7. An objective test unit, comprising: a test sheet having a plurality of shaded areas each of which represents an answer to a test question, the shaded areas having patterns visually apparently alike but actually slightly different as between correct and incorrect answers to each question, and a transparent scoring mask having substantially one pattern which creates light interference phenomena when superimposed upon said shaded areas.

8. An objective test sheet having a plurality of areas in predetermined positions each of which represents an answer to a test question, said areas being physically altered to provide light reflective patterns visually alike but differing in physical pattern as between correct and incorrect answer areas, the sheet being adapted to co-operate with a mask having a light transmissive pattern similar to certain of the areas but different from at least one of the areas whereby a light interference phenomena is developed which visually differentiates said correct and incorrect areas when said sheet is viewed through a mask.

9. An objective test sheet having a series of question areas, a plurality of answer areas associated with each question area, said answer areas being physically altered to provide light reflective patterns visually alike but differing in physical pattern as between correct and incorrect answer areas, the sheet being adapted to cooperate with a mask having a pattern similar to certain of the areas but different from at least one of the areas whereby a light interference phenomena is developed which visually differentiates between said correct and incorrect areas when said sheet is viewed through a mask.

10. The test sheet of claim 9 in which the physical alteration of the altered areas of the sheet causes the surface of each area to be covered with fine dark marks evenly distributed on a light background, the size and spacing of marks differing slightly between correct and incorrect answer areas but the gray tones thereto being visually the same.

11. The test sheet of claim 10 wherein the marks are fine parallel lines.

12. A transparent mask for scoring objective tests having shaded areas each of which represents an answer to a test question in which the answer areas are physically altered to provide light reflective patterns physically alike but differing in physical pattern as between correct and incorrect answer areas, said mask being physically altered so that it has substantially one light transmission pattern which creates light interference phenomena when superimposed upon a test sheet having such physically altered answer areas so as to vary the appearance as between correct and incorrect answer areas and visually differentiate said areas.

13. The device of claim 12 in which the scoring mask is photographic film which is physically altered by exposure to light and chemical treatment to provide a light transmission pattern in which the darkest parts do not conceal a pencil mark on a test sheet.

14. The device of claim 13 in which the photographic film is mounted upon a glass plate.

THELMA GWINN THURSTONE.
LOUIS L. THURSTONE.

No references cited.